A. F. KLASING.
CAR BRAKE.
APPLICATION FILED JULY 11, 1910.
977,634.
Patented Dec. 6, 1910.
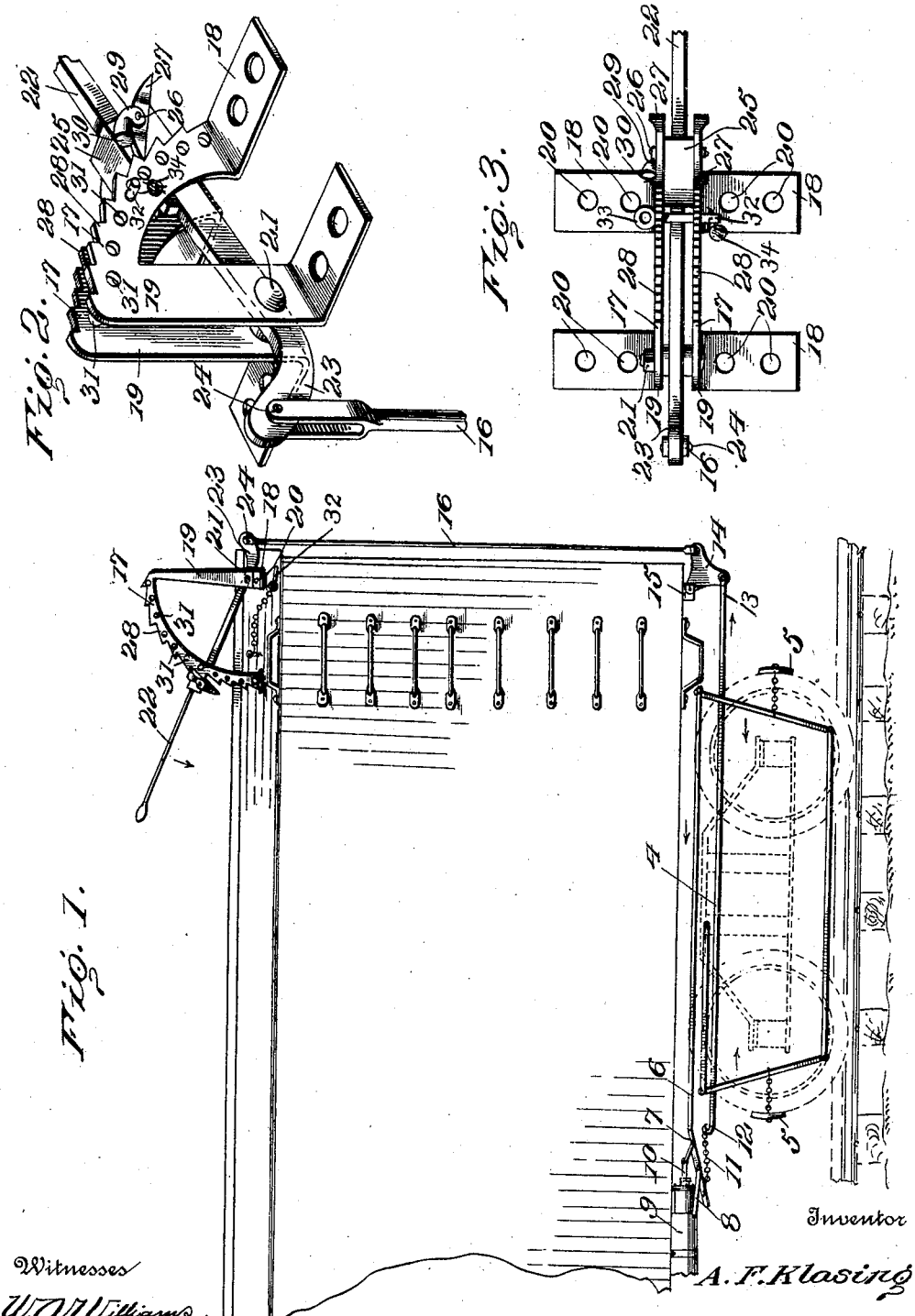
Witnesses
W. A. Williams.
F. R. Cornwall.
Inventor
A. F. Klasing.
By Dudley, Browne & Phelps
Attorney

UNITED STATES PATENT OFFICE.

AUGUSTUS F. KLASING, OF ROME, GEORGIA.

CAR-BRAKE.

977,634. Specification of Letters Patent. Patented Dec. 6, 1910.

Application filed July 11, 1910. Serial No. 571,419.

*To all whom it may concern:*

Be it known that I, AUGUSTUS F. KLASING, a citizen of the United States, residing at Rome, in the county of Floyd and State of Georgia, have invented certain new and useful Improvements in Car-Brakes, of which the following is a specification.

My invention relates to certain new and useful improvements in brake mechanism, and the object of my invention is to produce a hand operated device for brakes which is adapted to operate independently of the air brake mechanism, and which is simple and powerful in construction, composed of few parts, and a construction in which the brake can be locked to prevent any one maliciously or accidentally releasing the brakes.

With these and other objects in view my invention consists in certain constructions, combinations and arrangements of parts the preferred form of which will be first described in connection with the accompanying drawings, and then the invention particularly pointed out in the appended claims.

Referring to the drawings wherein the same part is designated by the same reference numeral wherever it occurs: Figure 1 is a side view of one end of a box car showing the same as equipped with my invention; Fig. 2 is a perspective view of the part of my invention which is placed on top of the car, and Fig. 3 is a top plan view of the mechanism shown in Fig. 2.

4 designates a car of any ordinary or desired construction provided with the wheel brakes 5, having the brake rod 6 connected to a lever 7 pivoted intermediate its ends to the fulcrum 8 mounted on the air brake cylinder 9, and to which the piston rod 10 of the air brake cylinder is connected.

11 designates a chain connected to the lever 7 to which is connected, by means of the hook 12, the rod 13. The hook 12 is formed on one end of the rod while the other end of the rod is connected to one arm of a bell-crank lever 14 pivoted to the underside of the car by the lug 15.

16 is a rod which extends upwardly from the third arm of the bell crank lever and is connected to the end of the hand operated mechanism which I will now describe.

Secured on top of the car are a pair of brackets spaced apart, each comprising a sector portion 17 which at one end terminates in an outwardly extending foot 18, adapted to be secured to the roof. At the other end each sector terminates in a downwardly extending leg 19 having an outwardly extending foot also adapted to be secured to the roof. The two brackets are secured in position on the roof by screws or the like 20, with the legs 19 nearer the edge of the car. Pivoted between the legs 19 by a pivot 21 is the operating lever 22 having the upwardly curved end 23 to which is pivoted the upper end of the rod 16 by means of the pivot 24.

Mounted on the lever 22 between the sectors, which are struck on a curve whose center is the pivot 21, is a bearing block 25, and 26 is a shaft passing through the block and having secured thereto at each end a pawl 27 one pawl being adapted to engage the ratchet teeth 28 of one sector and the other the ratchet teeth of the other sector. 29 is a weight loosely mounted on the shaft 26 outside the pawl 27 at that end which may be thrown to throw the pawls into or out of engagement with the ratchet teeth, as this weight has a portion 30 which extends over the pawl. The sectors are also provided with pairs of registering openings 31, through which a pin 32 having a head 33 at one end may be passed and the pin may be secured in position by locking a padlock 34 in an opening in the other end of the pin, thus locking the lever 22 against movement, tending to release the brake as shown in Fig. 2.

From the foregoing description of the construction it is believed that the operation is obvious, attention, however, being called to the fact that by the upwardly curved portion 23 of the lever the leverage is increased as the lever is depressed in the operation of applying the brakes.

I realize that considerable variation is possible in the details of construction and arrangement of parts without departing from the spirit of my invention, and I therefore do not intend to limit myself to the specific form shown and described.

What I claim as new and desire to secure by Letters Patent is:

1. A brake operating mechanism comprising a pair of sectors spaced apart, a lever fulcrumed between the sectors, said lever carrying a guiding block adapted to bear against the adjacent sides of the sectors, ratchet teeth formed on top of the sectors, a shaft journaled in the block, a pawl mounted on each end of the shaft, each pawl being adapted to engage the teeth of one ratchet, and connections from the lever to the brake mechanism.

2. A brake operating mechanism comprising a pair of sectors spaced apart, a lever fulcrumed between the sectors, said lever carrying a guiding block adapted to bear against the adjacent sides of the sectors, ratchet teeth formed on top of the sectors, a shaft journaled in the block, a pawl mounted on each end of the shaft, each pawl being adapted to engage the teeth of one ratchet, said lever being provided with an upwardly turned end, and connections extending from the upwardly turned end of the lever to the brake mechanism.

3. A brake operating mechanism comprising a pair of sectors spaced apart, a lever fulcrumed between the sectors, said lever carrying a guiding block adapted to bear against the adjacent sides of the sectors, ratchet teeth formed on top of the sectors, a shaft journaled in the block, a pawl mounted on each end of the shaft, each pawl being adapted to engage the teeth of one ratchet, and connections from the lever to the brake mechanism, said sectors being provided with registering openings in their sides and a pin adapted to be passed through said openings and locked in position for preventing movement of the lever in one direction.

In testimony whereof I affix my signature in presence of two witnesses.

AUGUSTUS F. KLASING.

Witnesses:
MARION JOHNSON,
WESLEY SHROPSHIRE, Jr.